United States Patent [19]
Ardezzone et al.

[11] 3,891,924
[45] June 24, 1975

[54] ADJUSTABLE MULTI-POINT PROBE HEAD ASSEMBLY

[75] Inventors: Frank J. Ardezzone, Santa Clara; Thomas A. Englert, San Jose, both of Calif.

[73] Assignee: Probe Rite, Inc., Santa Clara, Calif.

[22] Filed: Sept. 10, 1973

[21] Appl. No.: 395,964

[52] U.S. Cl............ 324/158 P; 324/72.5; 324/158 F
[51] Int. Cl......................... G01r 31/02; G01r 1/06
[58] Field of Search............ 324/158 P, 158 F, 72.5

[56] References Cited
UNITED STATES PATENTS
3,445,770   5/1969   Harmon.......................... 324/158 P OTHER PUBLICATIONS
"Future Probers–Here Now;" EDN; Nov. 11, 1968.

Wentworth Advertizement; Solid State Technology; June 1973; pg. 14.

*Primary Examiner*—Alfred E. Smith
*Assistant Examiner*—Ernest F. Karlsen
*Attorney, Agent, or Firm*—Schatzel & Hamrick

[57] ABSTRACT

A multi-point test probe head assembly for electromechanical interface contact with miniature electronic devices to be tested, the assembly including a plurality of adjustable probe tips each individually engaged to a probe arm and adjustment means for adjusting the relative position of each tip along three orthogonal planes.

5 Claims, 6 Drawing Figures

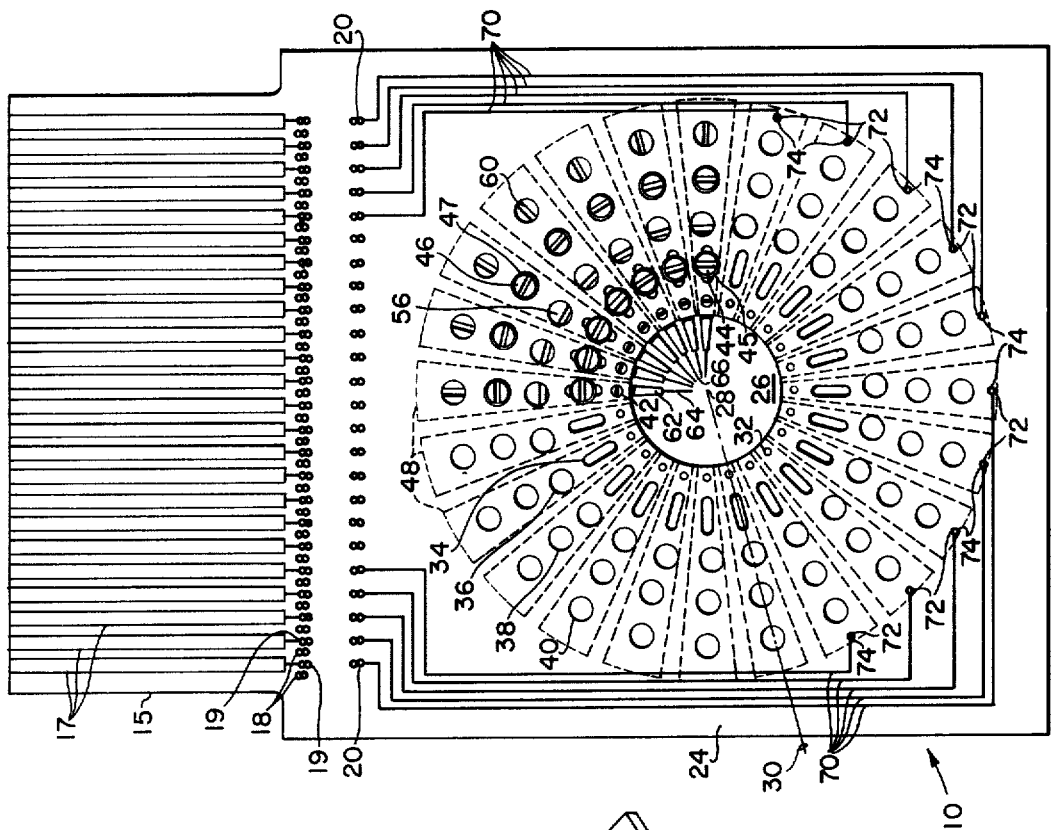
FIG_1
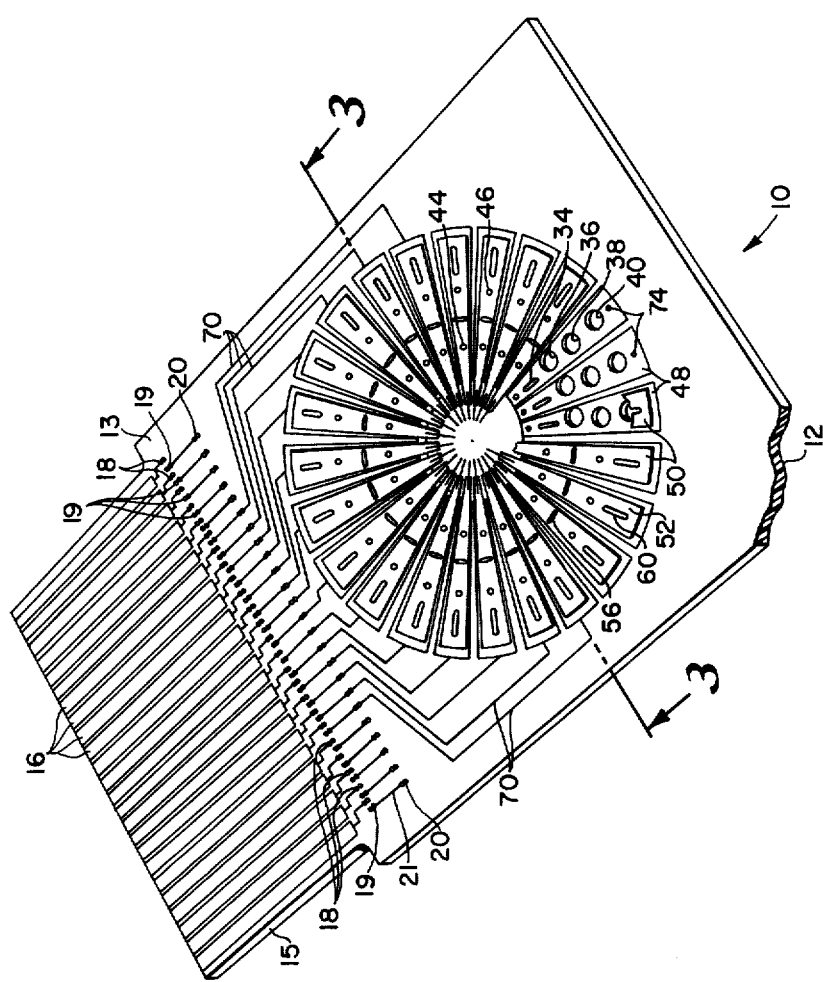
FIG_2

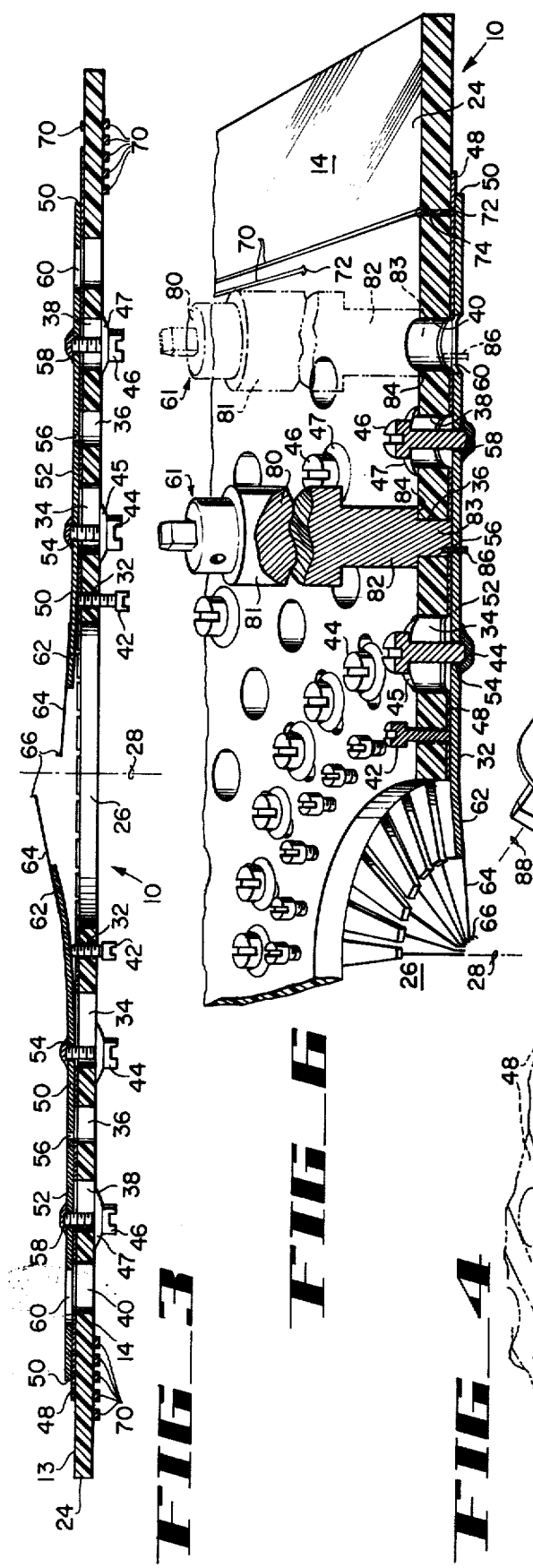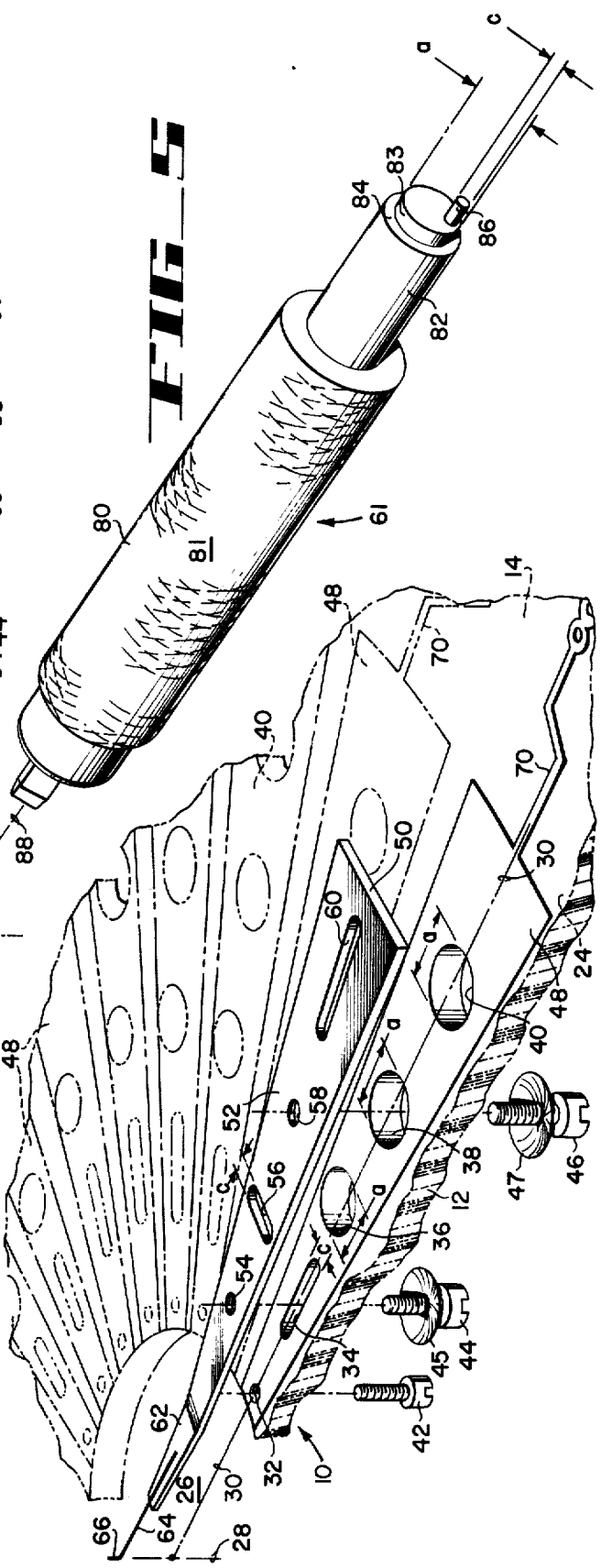

ADJUSTABLE MULTI-POINT PROBE HEAD ASSEMBLY

BACKGROUND OF THE INVENTION

1. Field of the Invention

The present invention relates generally to test probe apparatus for making electro-mechanical interface contact with the terminals of miniature electronic devices of which the electrical characteristics are to be tested and more particularly to adjustable multi-point test probe head assemblies whereby the format of the point contacts may be adjusted to accommodate electronic devices of differing terminal formats.

2. Description of the Prior Art

The practice of testing the electrical characteristics of miniature electronic devices, e.g., semi-conductor components, integrated circuits components, circuits, etc., is of prime importance to the electronic device manufacturer so as to discover the performance capabilities and defective devices prior to and after assembly. For example, in the semi-conductor industry it is desirable to test semiconductor devices while in wafer or slice form so as to eliminte unsatisfactory components early in the manufacturing process. The manufacturer further tests the devices after final assembly and prior to shipment for quality assurance. The end user of the devices commonly tests the devices prior to installation of the devices in the equipment in which the devices become a part. The increasing demand for these devices further dictates that there be continuous emphasis placed on the electronic industry to provide equipment capable of performing these tests at higher rates of speed with precise accuracy.

Developments in the electronic component industry continuously lead to further miniaturization of electronic devices. This in turn dictates that in the testing operations of semiconductor-types devices, it is desirable and necessary to simultaneously test more and more die positioned on a wafer and more and more pads positioned on the die. The high volume demand and the continuing further miniaturization of the devices require smaller pads closely positioned to one another. For example, presently pads of four mils square are commonly used. Pads of two mil square and pads of two mil diameter with one mil space between adjacent pads is becoming more widely used.

Multi-point probe head assemblies have been commonly used for the electro-mechanical interface contact of the devices with electronic test equipment. The interface probe head assembly need provide a large number of probe contacts of small size and dimensionally accurate in their relative positions to provide for the simultaneous interface contact of the probe contact tips with a large number of pads during the testing procedures. Also, the prevention of damage by the probe contacts to the metallized pads of the devices during the interface electro-mechanical contact is a prime objective. Various electronic devices carry pads of extremely thin layers of metal and demand extreme care during the interface contact of the pads with the probe contacts to avoid damage to the pads and circuit traces.

The probe head assemblies are generally mounted on a machine commonly referred to as a wafer probing machine. The testing operations include positioning a wafer or other electronic device to be tested on a chuck of the machine. With the machine in operation, the tip contacts of the probes are guided relative to the pads of the device under test to make the interface engagement of the tip contacts with the pads. Upon making the interface contact, the electronic test equipment electrically coupled through the probe head assembly senses and evaluates the electrical operation of the device. When the testing is complete with the pads, the tested device is moved on relative to the probe head assembly and another device is placed in position to repeat the testing operation.

Probe heads may assume any of various designs. They may be structured with various numbers of contact tips arranged in various formats depending upon the number of pads and pad configuration of the device to be tested. Adjustable probing machines are designed such that the probe points may be readily adjusted thereby permitting the probing machine to accommodate electronic devices of various configurations by changing the probe point position. In practice, it is common for a single wafer to carry a plurality of devices having similar pad formats such that the devices may be individually and successfully tested by a probe head of one design. The same test probe head may be used to test successive wafers of the same device configuration. Upon receipt of a wafer carrying devices of a different pad format, it has heretofore been necessary to adjust the probe point positions on the machine or to replace the probe head of a fixed card format to one having a different tip contact pattern configuration compatible with the pad format of the devices to be tested.

With heretofore test probe heads of the fixed point card format, the relative elevational position (planarization of point contacts) of the probe tip contacts relative to one another poses difficulties. Frequently, the relative position of a tip contact becomes altered through use or handling rendering it noncompatible with the pad format of the device to be tested. In such cases, it has been necessary to repair the probe head or replace it. A similar problem is encountered where the individual pads of the device are of differing planarization and thus not compatible with the particular format of the contact tips of the probe head. In this case, it is frequently necessary to discard the probe even though it may otherwise be satisfactory for use. Furthermore, in situations wherein the number of probe tip contacts (points) differ from the number of pads, it has been necessary to replace the probe head with one carrying a number of tips coinciding with the number of pads thus making the head customized.

Examples of probe head assemblies of the prior art are disclosed in co-pending patent application Ser. No. 201,098 by Frank J. Ardezzone, a co-inventor of the present invention; U.S. Pat. NO. 3,702,439 granted to McGahey, et al; U.S. Pat. No. 3,405,361 granted to L. E. Kattner, et al; and U.S. Pat. No. 3,445,770 granted to R. C. Harman.

SUMMARY OF THE PRESENT INVENTION

It is therefore a principle object of the present invention to provide an improved multi-point probe head assembly wherein the individual probe tip contacts may be adjusted in position relative to one another such that the pattern format of the tip contacts may be adjusted to be compatible with the pattern format of the pad terminals of the device to be tested.

Another object of the present invention is to provide an improved test probe head assembly wherein select ones of the individual probe tip contacts may be adjusted individually to assure contact with the devices under test. The other individual tip contacts are adjusted to avoid contact with the device under test. Thus devices having a lesser number of pad terminals than the number of probe tip contacts available can be tested with the same probe head.

Briefly, in accordance with the present invention, an exemplary embodiment of a multi-point probe head assembly for mounting on a wafer probing machine is illustrated. The assembly includes an electrical interconnect plug for electrical coupling with electronic test instruments. Integrally coupled to the platform is a rigid support member defining therein a common area in the form of a central opening. A plurality of rows of individual openings are placed within the support member. Each row of openings is in radial alignment relative to the axis of the central opening such that the rows project radially from the central opening. The rows are angularly spaced relative to one another about the opening. A plurality of elongated electrically conductive probe arms are engaged to the rigid platform with each arm in longitudinal alignment with a row of openings. Each arm carries a probe tip contact which projects to within the central opening. Fastening means retain each of the probe arms in position along the associated row of openings. Position adjust means is included to permit each individual probe arm to be adjusted radially and laterally relative to the central opening. Planarization (height) adjustment means is further included to permit adjustment of the elevation of each probe tip contact relative to the rigid support member. Thus, the adjustment means provides for adjustment of the relative position of each tip contact within the common area to that of the other tip contacts and to the support members. Conductive means is further included to electrically couple each of the probe arms to interconnect plug.

Thus, an advantage of the present invention is that it permits positional adjustment of the probe tip contacts relative to one another to accommodate devices of various pad terminal patterns. Another advantage is that the probe tip contacts may be elevated relative to one another such that a probe head may be utilized for testing devices having a number of pads less than the number of probe tip contacts carried by the head. Also, the elevation of the tip contacts may be adjusted to accommodate pads of varying elevations.

These and other objects and advantages of the invention will become apparent to those of ordinary skill in the art after having read the following detailed description of the preferred embodiment which is illustrated in the several figures of the drawing.

BRIEF DESCRIPTION OF THE DRAWINGS

FIG. 1 is a perspective, partially sectioned view of the bottom side of a probe head test assembly of the present invention with two of the probe arms removed;

FIG. 2 is a planar top side view of the probe head assembly of FIG. 1 with several of the individual probe arms and tip contacts removed;

FIG. 3 is a cross-sectional view of the assembly of FIG. 1 taken along the line 3—3 and illustrating two probe tip contacts at differing elevations;

FIG. 4 is an exploded perspective view of a segment of the probe head assembly of FIG. 1 illustrating the inter-relation of component parts;

FIG. 5 is an enlarged perspective view of a hand tool for use in making lateral and radial positional adjustments of the probes of the assembly of FIG. 1; and FIG. 6 is a perspective, partially sectioned view of the probe head assembly of FIG. 1 and illustrating the interaction of the adjustment tool for making lateral and radial positional adjustments of the probe arm.

DESCRIPTION OF THE PREFERRED EMBODIMENT

The drawings illustrate a multi-point electrical test probe head assembly, referred to by the general reference character 10 according to the present invention. The assembly is adapted to be mounted on a wafer probing machine (not shown) such that it may provide an interface electrical coupling between semiconductor devices to be tested and electronic test equipment. As illustrated, the assembly 10 is adapted to carry twenty-four individual probe tip contacts each of which may make interface contact with a pad terminal on the electronic device to be tested. The head assembly 10 includes a platform in the form of a fiberglass board 12 having a planar bottom side surface 13 and a top side surface 14. The board establishes a male insertable plug section 15 carrying a plurality of individual conductive traces 16 about the bottom side 13 and a plurality of individual conductive traces 17 about the top side 14 to provide an electrical interconnect with test equipment (not shown). Each of the traces 16 is electrically coupled to a plated hole 18 and each of the traces 17 is electrically coupled to a plated hole 19 such that electrical connection to any one of the traces 16 or 17 may be made from either side. About the bottom side 13 of the board the plated holes 19 are joined to a plurality of terminals in the form of plated apertures 20 by a plurality of traces 21. Electrical connection to any of the interconnects 20 may be made from either side. This arrangement further permits interruption of the electrical connection between any interconnect 20 and the terminal 19 by opening the associated trace 21.

A rigid planar probe support section 24 is established by the board 12 and defines a common area in the form of a circular central opening 26 about a central axis 28. A plurality or rows of openings project through the board 12 within the support section 24. Each row projects in radial alignment from the axis 28 as illustrated by the probe radial line 30 (FIGS. 1, 2, and 4) with the rows spaced at 15° increments. Each row of openings includes a circular threaded bore 32, an oblong smooth surface bore 34 in which the longitudinal axis is coincident with the radial line 30 within a range of adjustment, and three circular bores 36, 38 and 40 of diameter $a$. The center of two of said bores is in alignment with the radial line 30 and central axis 28. The center of the third bore is positioned laterally from the line 30. A threaded adjustment screw 42, hereinafter referred to as the elevational adjustment screw, is threaded in the aperture 32 from the top side surface 14 and is adapted to project from the bottom side surface 13. A threaded fastener screw 44 with a Bellville washer 45 is received from the top surface 14 to within the oblong bore 34 and projects therethrough. The diameter of the screw 44 is substantially equivalent to the minor diameter $c$ of the bore 34 such that minimal lateral deviation is realized while permitting the screw to be urged along the long axis of the opening 34. A screw 46 with a Bellville washer 47 is received and projects thrugh the opening 38. The diameter of the body of the screw 46 is less than the diameter $a$ of the aperture 38 to permit the screw 46 to be repositioned within the aperture.

About each row of openings in the board 12 is a thin film segment of conductive material 48 (e.g., copper) liminated to the surface 13. The conductive segments 48 are evenly spaced about the opening 26 and form a plurality of triangular shaped conductive surfaces. Superimposed over each of the conductive segments 48 is an electrically conductive elongated probe arm 50 positioned in longitudinal alignment with each row of openings of each segment. Each probe arm 50 comprises a planar main support section 52 having a planar surface for intimately mating with the conductive film 48. The arms 50 carry a plurality of openings including an internally threaded bore 54, an oblong slot 56, an internally threaded bore 58 and an oblong tool insert slot 60. The slots 56 and 60 are of a width $c$ which is substantially less than the diameter of the bores 36 and 40 of the board. The longitudinal axis of the slot 56 is at right angles to the longitudinal axis of the main support section of the arm 50 and the longitudinal axis of the slot 60 is parallel with the longitudinal axis of the main support section 52. The openings 54, 56, 58 and 60 are in alignment with the openings 34, 36, 38 and 40 respectively of the rigid support member 24. The probes 50 are secured in abuttment to the films 48 and the rigid support member 24 by the fastener screws 44 and 46 which respectively screw into the threaded bores 54 and 58. The oblong slot 56 is in alignment with the opening 36 and the oblong slot 60 of the probe arm 50 is in alignment with the opening 40. Accordingly, the probe arms 50 may be secured in place and in electrical contact with the films 48 by firmly tightening the fastener screws 44 and 46. Once secured in place finite radial adjustments of the probe position may be made by manipulation of an adjustment tool 61 (See FIG. 5) inserted inn the board opening 36 and the slot 56 of the probe arm. As hereinafter described in greater detail, manipulation of the tool 61 while in engagement with the slot 56 causes the probe to move in radial direction. To make lateral positional adjustments, the tool 61 is inserted in the board opening 40 and the probe slot 60. The tool 61 is then rotated. In making lateral adjustments, the probe 50 pivots about the fastener screw 44. In making radial adjustments, the screws 44 and 46 shift radially within the slot 34 and bore 38, respectively. The screw 46, being of less diameter than that of the opening 38, may move laterally and radially relative to the central opening 26.

Each of the probe arms 50 further include an extension arm section 62 projecting from the main section 52 to within the defined central opening 26. The extension 62 is at an incline of a few degrees (e.g. 3°–5°) relative to the plane of the main section support member 24. It may be noted that the elevational adjustment screw 42 is positioned near the intersection of the main section 52 and extension arm 62 of the probe 50 with the end of the screw abutting the surface of the probe arm.

Thus, the elevation of the extension arm segment 62 relative to the planar surface 13 may be adjusted by the elevational adjustment screw 42. Engaged about the end of each of the extensions 62 and projecting therefrom is a contact arm 64 carrying a tip contact 66 at the terminal end. The contact arm 64 and tip contact 66 may be in the form of a thin resilient wire and the relative elevation of the tip contacts 66 may be adjusted by the elevational adjustment screws 42. Accordingly, in operation the radial, the lateral, and the elevation positions of each of the tip contacts 66 may be established precisely and individually. Generally, in making the fine positional adjustments, an individual views the tip contacts 66 through a microscope and simultaneously makes the adjustments.

The thin film pads 48 are each individually electrically coupled to an associated terminal 20 by means of a trace 70 comprised of an elongated film of conductive material, e.g., copper laminated to the planar surface of the board 12. In the illustrated embodiment wherein twenty-four tip contacts 66 are accommodated, fourteen of the traces 70 are positioned on the bottom side surface 13 (See FIG. 1) and ten of the traces are positioned on the top side surface 14 (See FIG. 2). The fourteen traces 70 on the surface 13 are engaged directly to the pads 48 and are joined to the fourteen pads closest to the terminals 20. The ten traces 70 on the top surface 14 are joined to the other ten terminals 20 by means of engagement to a plated film 72 carried by the walls of apertures 74 projecting from pads 48 through the board 12 to the surface 14. The apertures 74 are formed within the pad areas of the ten pads 48 located the furtherest distance from the terminals 20. As illustrated by FIG. 2, the traces 70 on the surface 14 are connected to the five terminals 19 about each end of the row of terminals 20.

Probe head assemblies of the embodiment 10 may incorporate probe arms 50 comprised of copper alloy (e.g., 9% nickel, 2% tin, and 89% copper) with a gold plate (e.g., 100 microinch thickness). The pads 48, traces 70, traces 16, traces 17 and interconnects 21 may be formed of a copper thin film. The terminals 18, 19, 20 and the plating 74 may all be of copper. The pads 48 may also be coated with a layer of gold plate (e.g., 100 microinch thickness) to provide a gold-to-gold interface connect with the probe arms 50. It has also been recognized that a conductive grease filled with gold or/and silver may also used be to interface the arm 50 with the pads 48. Points may be copper alloy, rhodium plated tungsten, platinum alloy or gold alloy.

Referring now more specifically to the adjustment tool 61, as illustrated in FIG. 5, the tool 61 includes a cylindrical body 80 having a knurled surface 81 which may be grasped in the hand of an individual. Projecting from one end and coaxial with the body 80 is a first cylindrical boss 82 and a second cylindrical boss 83 of the diameter $a$. The intersection of the bosses 82 and 83 forms a shoulder 84. An off-set pin 86 of a diameter $c$ projects from the end of the boss 82. The pin 86 is off-set relative to the axis of rotation 88 of the bosses 82 and 83. Viewing FIG. 6, in making lateral adjustments of an individual probe 50, the tool 61 is inserted coaxially in the board opening 40 from the top side 14 such that the boss 83 fits within the interior of the bore 40 and the shoulder 84 rests on the top surface 14 about the opening. The pin 86 mates within the slot 60 of the probe. As the tool 61 is rotated about its axis, the pin 86 assumes a planetary path about the axis of the opening 40 and causes an exertion of lateral pressure on the probe 50. The probe 50 in turn rotates about the axis of the fastener pin 44 such that the tip contact 66 moves in the opposite lateral direction within the central opening 26. To realize radial adjustment of the individual probe positions, the tool 61 is inserted in the board opening 36 with the pin 86 mated within the slot 56 of the probe arm. Rotation of the tool 61 results in the pin 86 urging the probe radially. In radial movement, the fastener pin 44 shifts along the radial path within the oblong slot 34 and the fastener pin 46 shifts within the oversized opening 38. For purposes of illustration, FIG. 6 illustrates a cross-sectional view of a segment of the assembly 10 with tools 61 in position for lateral and radial adjustments as described above. The tool 61 also carries a screwdriver tip to accommodate adjustments of the screws 42 to set the planarization of the tip contacts.

In testing operations, the probe head assembly 10 is mounted on a probing machine. The device to be tested is placed on the machine chuck. The chuck and the head are moved relative to one another in a position such that the individual tip contacts 66 are in alignment with the pads of the device under test. Through a microscope, the relative elevational, radial and lateral position of the individual tip contacts 66 are viewed and positional adjustments of the probes 50 are made such that the pattern of the tip contacts 66 coincides with the pattern of the pads. In the event there are more tip contacts 66 than pads on the device to be tested, the unnecessary tip contacts are elevationally adjusted by the screws 42 so as not to interfere with the device under test and with only the essential tip contacts 66 in interface contact with the device under test. For example, the cross-sectional view of FIG. 3 illustrates the relative elevational position of two probe tip contacts 66.

The test probe head assembly 10 is further adapted such that additional components may be interconnected with the assembly in the event it is desirable. The terminals 19 and 20 are such that they may be readily joined in series or parallel with other components or interconnected to other ones of the terminals 19. Further, the traces 21 intermediate the terminals 19 and 20 may be opened if desired.

Accordingly, the present invention provides a multi-point electrical test probe head assembly which may be utilized in various testing applications and is versatile.

Although a single preferred embodiment of the present invention has been disclosed hereinabove, it is contemplated that various modifications of the invention will become apparent to those skilled in the art after having read the foregoing description. Accordingly, it is intended that the description not be considered limiting, and that the appended Claims be interpreted to cover all alterations and modifications above which fall within the true spirit and scope of the invention.

What is claimed is:

1. A multi-point electrical test probe head assembly for interface contact with miniature electronic devices to be tested, the assembly comprising, in combination:
   a platform carrying an interconnect plug means for electrical interconnection with electronic test instruments;
   a planar probe support member integrally coupled to the platform, said support member defining a central opening therein, a plurality of rows of individual openings within said support member, each row of openings being in a fixed pattern along a radial path line projecting from said central opening, at least one opening of each row of openings of the support member being oblong with the longitudinal axis in alignment with the central opening;
   a plurality of elongated electrically conductive probe arms having a planar main part and an extension arm extending from one end of the main part, each probe arm being positioned with the planar main part thereof in overlapping engagment with the support member, the planar main part of each of the probe arms carrying a plurality of openings arranged in a row along the longitudinal axis of the probe arm and radial to the central opening, each row of openings including a first oblong slot, a second oblong slot and a pin engagement bore intermediate the first and second slots, the longitudinal dimension of the two oblong slots being at right angles relative to one another and the width of the slots being substantially less than the diameter of the mated openings of the board, each opening of the probe arm being in alignment with an opening of an associated row of openings of the board to establish related pairs of openings between each probe arm and the support member, a tip contact engaged to and extending from the terminal end of each of the extension arms, each of said tip contacts projecting to within said central opening, said tip contacts being positioned for making interface contact with electronic devices positioned adjacent said central opening;
   fastening means for securing the planar main part of each of said probe arms in place and in abutment to said support member with each arm being secured about a row of openings along one of said radial paths, the fastening means including fastener pin means engaged through at least one pair of openings between the board and each probe arm including the pin engagement bore to secure the arm in place to the support member, said fastening means being free to move within the opening of the board laterally and radially relative to the central opening;
   positional adjustment means coupled to the planar part of each of said probe arms and said platform of adjusting the lateral and radial position of said probe arms relative to said central openings of said probe support; and
   electrical coupling means for coupling the probe arms with said interconnect plug means.

2. The test probe assembly of claim 1 wherein
   a plurality of thin film pads of conductive material are deposited on the surface of the support member about the central opening, each of said pads being in abutment with a probe arm; and
   the electrical coupling means is electrically coupled to said pads.

3. The test probe assembly of claim 2, wherein
   the electrical interconnect means includes a plurality of individual traces with each trace extending intermediate one of said pads and said interconnect plug.

4. The test probe assembly of claim 3, including
   an adjustment tool having a projection insertable within said first and second slots of said probe arms, said tool being movable while in engagement within either of said slots to transmit force to the side walls of said slots.

5. The test probe assembly of claim 4 wherein
the first and second slots are of substantially the same width;
the openings within each row of the support member positioned adjacent the first and second slots of the associated probe arms are of equal diameter and greater than the width of first and second slots; and
the projection tool includes a boss with an off-center projection projecting from the end of said boss, said boss being insertable within said openings mated with said first and second slots and the projection within the associated slot of the probe arm.

* * * * *